United States Patent Office
3,134,792
Patented May 26, 1964

3,134,792
PRODUCTION OF α,β-UNSATURATED KETOSTE-ROIDS HAVING A METHYL GROUP ON THE β-POSITION CARBON ATOM
Emanuel Kaspar, Berlin-Wilmersdorf, Rudolf Wiechert, Berlin-Lichterfelde, and Martin Schenck and Alfred Popper, Berlin-Frohnau, Germany, assignors to Schering AG, Berlin, Germany
No Drawing. Filed Dec. 5, 1960, Ser. No. 73,495
Claims priority, application Germany, Dec. 5, 1959
18 Claims. (Cl. 260—397.4)

The present invention relates to the production of α,β-unsaturated ketosteroids having a methyl group at the β-position carbon atoms, to the compounds and to the method of producing such compounds.

It is known that diazomethane can add onto α,β-unsaturated ketosteroids to form corresponding pyrazolines. Such diazomethane addition to form pyrazolines and the splitting off of nitrogen by thermal treatment or by treatment with a strong acid catalyst such as perchloric acid, fluoroboric acid or boron trifluoride etherate, dissolved in a suitable organic solvent, has been described in U.S. patent application of Wiechert et al., Serial No. 60,812, filed October 6, 1960. This process results in the production of the saturated α,β-methylene ketosteroid.

It is a primary object of the present invention to provide for a method of splitting off nitrogen from pyrazolines formed by the addition of diazomethane to an α,β-unsaturated ketosteroid whereby the resulting compound is the corresponding β-methyl ketosteroid.

It is another object of the present invention to provide new β-methyl ketosteroids of α,β-unsaturated ketosteroids.

It is yet another object of the present invention to provide a new group of compounds of the steroid series having important physiological properties.

It is yet another object of the present invention to provide a direct and easily duplicatable method of directly producing α,β-unsaturated ketosteroids carrying a methyl group on the β-position carbon atom.

Other objects and advantages of the present invention will be apparent from a further reading of the specification and of the appended claims.

With the above and other objects in view, the present invention mainly comprises a compound selected from the group consisting of compounds of the general formula:

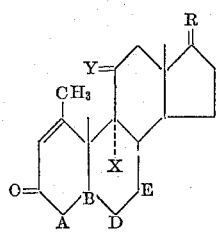

and compounds of the general formula:

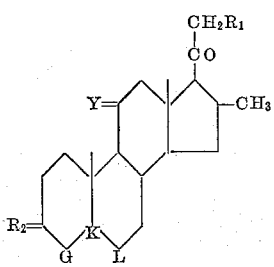

wherein R is selected from the group consisting of

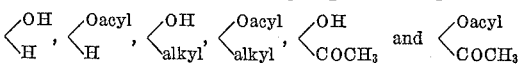

wherein X is selected from the group consisting of hydrogen, chlorine and fluorine, wherein Y is selected from the group consisting of =O,

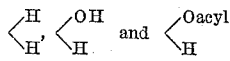

wherein

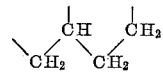

is selected from the group consisting of

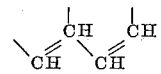

and

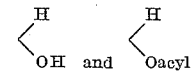

wherein $R_1$ is selected from the group consisting of hydrogen, OH and Oacyl, wherein $R_2$ is selected from the group consisting of =O,

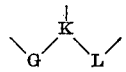

wherein alkyl is a lower alkyl and wherein acyl is derived from a carboxylic acid of 1–11 carbon atoms, and wherein

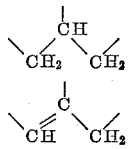

is selected from the group consisting of

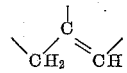

and

As will become apparent from the further description which will follow the present invention is directed to the production of such new compounds as 1-methyl-Δ¹-androstene-17β-ol-3-one and 17-esters thereof with carboxylic acids of up to 11 carbon atoms, such as the 17-acetate, the 17- propionate, etc.

The present invention also relates to the production of such new compounds as 1-methyl-Δ¹,⁴,⁶-androstatriene-17β-ol-3-one and to 17-esters thereof with carboxylic acids of up to 11 carbon atoms, such as the 17-acetate. Among the other compounds of the present invention are 1 - methyl - Δ¹,⁴,⁶ - pregnatriene-17α-ol-3,20-dione and 17-esters thereof with carboxylic acids of up to 11 carbon atoms.

In addition the present invention provides as new compounds 16-methyl-Δ⁵,¹⁶-pregnadiene-3β-ol-20-one and 3-esters thereof with carboxylic acids of up to 11 carbon atoms.

The method of producing α-β-unsaturated ketosteroids having a methyl group on the β-positioned carbon atoms in accordance with the present invention mainly comprises treating a pyrazoline obtained by adding diazomethane to an α,β-unsaturated ketosteroid distributed in an organic liquid with an adsorption agent in acid medium. This results in the splitting off of the nitrogen and the forming of the corresponding methyl derivative which may then be recovered by the use of otherwise common procedures.

Among the pyrazolines which may be used as starting compounds for the method of the present invention are pyrazolines of the following general formula:

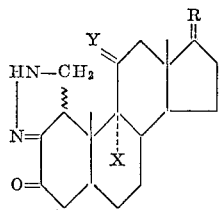

or compounds of the following general formula:

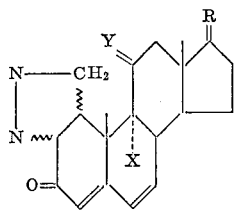

wherein R, X and Y have the same definitions as above.

Also suitable as starting pyrazolines according to the method of the present invention are compounds of the following general formula:

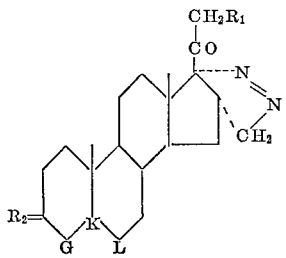

wherein $R_1$ and $R_2$ have the same definitions as above.

It has been found that it is possible to catalytically split off nitrogen from pyrazolines and to produce thereby $\alpha,\beta$-unsaturated $\beta$-methyl ketosteroids by carrying out the splitting off not in a homogeneous solution containing an acid catalyst, but rather by using a surface active acid adsorption agent and by having the pyrazoline dissolved or suspended in an organic liquid which will eluate the pyrazoline only slightly. This results in the production of the $\beta$-methyl ketosteroid, which is most surprising.

Among the suitable adsorption agents for use in the method of the present invention are those which are in general useful in adsorption chromatography, such as aluminum oxide, silica gel, fuller's earth, ion exchange resins and the like. These adsorption agents which are not naturally acid reacting can be made active for the purposes of the present invention in known manner by acid treatment to activate the same, and it is necessary in this respect to achieve a specific degree of acidity. This can be determined by suspending a sample of the acid treated and then dried adsorption agent in a specific amount of water and determining the pH of the suspension before use thereof. The pH can in this manner be adjusted as desired.

In the practical carrying out of the splitting off of the nitrogen in accordance with the present invention the dry acid adsorption agent is suspended in an equally dry organic liquid by stirring or shaking. The pyrazoline to be split is then in finely pulverized condition or in solution introduced into the suspension of the acid adsorption agent. The reaction mixture is stirred or shaken until the development of nitrogen ends, the adsorption agent is separated off and it is treated with the best possible eluating solvent in order to dissolve out the remaining reaction product from the adsorption agent. The reaction product is then isolated by evaporating solvent and if necessary purified in normal manner.

The method of splitting off nitrogen in accordance with the present invention is applicable to those pyrazolines which could not be split by prior known methods with acid catalysts, such as the diazomethane addition products of $\Delta^1$-3-ketosteroids. These compounds are in reality $\Delta^2$-pyrazolines [I.R.: C=N band at $6.45\mu$, red displaced keto band at $6.96\mu$ (due to the conjugation of the 3-keto group) to distinguish from the $\Delta^1$-pyrazolines which by the addition of diazomethane form $\Delta^{1,4,6}$-ketosteroids or $\Delta^{16,20}$-ketosteroids (I.R. weak N=N band at $6.4$–$6.45\mu$, keto band in normal range).] The different structure can be the basis for the failure of the splitting off of nitrogen under the hitherto used conditions. Although the scope of the invention is not meant to be limited as to any theory of how or why the method of the present invention operates to give the desired results, such theory is offered in the hope that it will help towards a better understanding of the invention. It is assumed that by means of the adsorption agent another pyrazoline compound is formed from the primary $\Delta^2$-pyrazoline, and this other pyrazoline compound is then easily split off.

As indicated in the above set forth general formulas of the starting compounds of the present invention and of the compounds produced in accordance with the present invention the ketosteroids of the invention can be substituted in normal manner so that, for example, they may contain or free or esterified hydroxyl groups or free or functionally changed keto groups, or halogen atoms.

Among the esterified hydroxyl groups the present invention is particularly concerned with esters formed by the hydroxyl group esterified with an aliphatic, alicyclic, aryl aliphatic, aromatic or heterocyclic carboxylic acid of 1–11 carbon atoms, as for example acetic acid, chloroacetic acid, propionic acid, butyric acid, diethyl acetic acid, enanthic acid, caproic acid, undecylenic acid, cyclopentyl propionic acid, succinic acid, phenylacetic acid, furan carboxylic acid, phenoxy acetic acid, caprinoic acetic acid, benzoic acid, etc.

For the production of the corresponding 1-methyl-17$\alpha$-alkyl-$\Delta^1$-androstene-17$\beta$-ol-3-one the given method is less suitable since the direct addition of diazomethane onto 17$\alpha$-alkyl-$\Delta^1$-androstene-17$\beta$-ol-3-one, particularly onto 17$\alpha$-methyl-$\Delta^1$-androstene-17$\beta$-ol-3-one, for unknown reasons is extraordinarily difficult.

In the search for more suitable methods of production for these compounds it has been found that the 17$\alpha$-methyl group can by Grignard reaction in per se known manner be introduced into the molecule of 1-methyl-$\Delta^1$-androstene-3,17-dione if the 3-keto group is protected in per se known manner for example by ketalization with ethylene glycol and then freed after the end of the Grignard reaction. In this manner it is possible to obtain with technically satisfactory yields for example the desired 1,17$\alpha$-dimethyl-$\Delta^1$-androstene-17$\beta$-ol-3-one.

If desired the 17-position hydroxyl group of the 1,17$\alpha$-dimethyl-$\Delta^1$-androstene-17$\beta$-ol-3-one can be esterified with acids normally used for esterification of steroid hormones.

In order to introduce the 17$\alpha$-ethyl group into the molecule of 1-methyl-$\Delta^1$-androstene-3-17-dione it is possible to proceed in an analogous manner to the previously described method of introducing the 17$\alpha$-methyl group. It is also advantageous to introduce instead of the ethyl group first, in entirely analogous manner, a 17$\alpha$-ethinyl group and to then hydrogenate this group in known manner to the ethyl group. The 1-methyl-$\Delta^1$-androstene-3,17-dione-3-ethylene ketal which is used as starting material can advantageously be obtained from 1-methyl-$\Delta^1$-androstene-17$\beta$-ol-3-one by ketalization and subsequent oxidation of the 17-hydroxyl group of the ketal by means of cyclohexanone in the presence of aluminum isopropylate, as described in Example XII of this application.

The esters of the β-methyl-α,β-unsaturated ketosteroids of the present invention can be obtained by splitting off nitrogen from the pyrazoline which has already been esterified with the desired carboxylic acid. The splitting off of the nitrogen can be carried out thermally where possible, or advantageously, in accordance with the method of the present invention by means of the acid adsorption agent, as described in Example I–XI of this application. The esterified pyrazoline which is necessary for this method is preferably produced by the diazomethane addition at the β-position of the corresponding ester of the unsubstituted α,β-unsaturated ketosteroid.

Instead it is also possible to produce the esters by directly esterifying the β-methyl-α,β-unsaturated ketosteroid with the desired acid or its reactable derivative for example with the chosen acid halogenide or anhydride in per se known steroid chemical methods, as described in Examples XVI, XVII and XVIII of this application.

The compounds produced in accordance with the present invention can be used as intermediates in the production of various steroids, for example by esterifying free hydroxyl groups, by hydrogenation, etc. In addition the compounds may themselves be used for their physiological properties.

The compound 1-methyl-$\Delta^1$-androstene-17β-ol-3-one exhibits along with a relatively slight androgenic action a relatively high anabolic activity, which as has been demonstrated by subcutaneous administration to castrated rats in comparison with testosterone. It is known that the value of the increase of the levator ani in comparison to the increase of the weight of the seminal vesicle in the case of 1-methyl-$\Delta^1$-androstenolone is approximately 12 times the value obtained for testosterone.

The new 1,17 α-dimethyl-$\Delta^1$-androstene-17β-ol-3-one upon peroral administration acts in such manner that the increase of weight of the levator ani is considerably greater than the increase of the seminal vesicle. Upon peroral administration 12 times of 1000 gamma each time to castrated male rats it was found that with an increase of the seminal vesicle of 10 mg. there was an increase of the levator ani of 30 mg. This is an extraordinarily favorable ratio of anabolic to androgenic activity.

It has further been found in accordance with the present invention that a group of hitherto unknown esters, particularly the esters of aliphatic carboxylic acids of 1-methyl-$\Delta^1$-androstenolone exhibit in comparison to the free steroid alcohol, particularly in low dosage, a considerable increase in the direction of anabolic effect but only a slight increase in the direction of androgenic effect so that the relative effectiveness (anabolic to androgenic) can be changed in one direction by suitable esterification of the 1-methyl-$\Delta^1$-androstenolone, the change of course being in a favorable sense. This is completely surprising and could not be predicted since esterification of testosterone works in an entirely contrary manner in that the androgenic action is increased in comparison to the anabolic action.

It has been found that in addition to the above mentioned favorable displacement of the relative action of several esters of 1-methyl-$\Delta^1$-androstenolone, particularly the esters of the long chain aliphatic carboxylic acids such as enanthic acid, there is also obtained a very desirable protraction of the anabolic effect.

This too was not to be expected for the required low doses which will not produce any substantial androgenic effect, since the known effective esters of testosterone which have a substantially protracted effect much more rapidly lose the anabolic effect than the androgenic effect.

The following comparative tests which were carried out, which prove the mentioned effect of the 1-methyl-$\Delta^1$-androstenolone esters of the present invention:

The action of the compared compound was determined in normal manner on castrated male rats.

In a first rough valuation series there is first determined the weight of the levator ani or of the seminal vesicle which is achieved by subcutaneous administration of 12 times each 1000 gamma, 100 gamma, 10 gamma and 1 gamma in oily solution.

In a second fine evaluation there is then determined the increase of weight of the seminal vesicle in mg. per 100 g. of test animal for each dose, which upon 12 subcutaneous administrations brings the weight of the levitor ani to the value of 50 mg. per 100 g. of the test animal. The results are summarized in the following table:

TABLE 1

| Compound | Dose | Increase of weight of seminal vesicle |
|---|---|---|
| Testosterone-propionate | 0.045 | 230 |
| 17α-ethyl-19-nortestosterone | 0.06 | 70 |
| 4-Chloro-testosterone-acetate | 0.18 | 60 |
| 1-Methyl-$\Delta^1$-androstene-17β-ol-3-one | 0.20 | 10 |
| 1-Methyl-$\Delta^1$-androstene-17β-ol-3-one-acetate | 0.018 | 0 |
| 1-Methyl-$\Delta^1$-androstene-17β-ol-3-one-propionate | 0.12 | 20 |

It is apparent from the above that in the case of testosterone propionate which even in very low dose exhibit the defined normal anabolic action, it is the androgenic action which still controls. In the case of 17α-ethyl-19-nortestosterone both types of action are strongly decreased (increase of the necessary dose). The androgenic activity however is still greater than the anabolic activity. A practically equal activity relationship shows that 4-chloro-testosterone-acetate has both activities greatly developed as compared to 17α-ethyl-19-nortestosterone (lowering of the necessary dose).

In the case of 1-methyl-$\Delta^1$-androstene-17β-ol-3-one it is apparent that the androgenic side effect despite a simultaneously increased anabolic action is repressed to a greater extent than in the previously mentioned comparison substances.

The following examples clearly illustrate the inferior androgenic effect with a simultaneous increase of the anabolic effect as a result of the esterification of 1-methyl-$\Delta^1$-androstenolone.

In the case of the acetate the androgenic side action practically completely disappears.

The above mentioned protraction of the anabolic effect of the esters of 1-methyl-$\Delta^1$-androstene-17β-ol-3-one with long chain aliphatic carboxylic acids is proved by the following series of tests carried out with 1-methyl-$\Delta^1$-andostene-17β-ol-3-one-enanthate.

Castrated male rats were subcutaneously injected one time with 10 mg. of the enanthate in oily solution and the weight of the levator ani or the seminal vesicle at the end of the given time period was determined.

TABLE 2

| Duration of Time, weeks | Weight of the Levator Ani, mg. | Weight of the seminal vesicle, mg. |
|---|---|---|
| 1 | 53 | 107 |
| 2 | 50 | 51 |
| 3 | 46 | 77 |
| 4 | 55 | 51 |
| 6 | 42 | 36 |
| 8 | 48 | 60 |
| 10 | 40 | 26 |

It is apparent from the above that the still recognizable androgenic side effect rapidly disappears while the anabolic effect remains practically unchanged and strong until the end of the 10 week period.

The following series of tests in which one administration of 1 mg. of enanthate was given shows that with lower doses the androgenic side action is still better eliminated without excluding the anabolic effect:

TABLE 3

| | | |
|---|---|---|
| 1 week | 36 | 35 |
| 2 weeks | 31 | 25 |
| 3 weeks | 25 | 16 |
| 4 weeks | 27 | 14 |

The results of the animal experiments are confirmed by clinical tests of the acetate and the enanthate based on the metabolism balance.

(A) 1-methyl-$\Delta^1$-androstene-17$\beta$-ol-3-one-acetate (as an oily solution in ampoules of 10 mg./cc.) are injected intramuscularly in doses of 10-20 mg. daily or every two days under controlled diet with constant albumin intake (after a prior control period).

The total nitrogen in the urine and the calcium liberated was determined.

The nitrogen elimination is significantly lowered with the above mentioned dose, the reduction amounting to about 4 g. per day.

The calcium elimination is also markedly decreased during the medication period.

From the further continuation of the metabolism determination after the end of the medication period it is apparent that the acetate acts as a short duration preparation. 2 days after ceasing of the injection the nitrogen and the calcium elimination increased to the same level as before the test period.

The treatment time of the tests was from 7-14 days. No side effects or phenomena of any type were noticed.

(B) 1 - methyl - $\Delta^1$ - androstene - 17$\beta$ - ol - 3 - one-enanthate (as an oily solution in ampoules containing 100 mg./cc.) are injected intramuscularly in doses of 100 mg. each in 7-12 day intervals. The medication with the enanthate is commenced after a prior control period of 8 days under simultaneously controlled diet with constant protein intake.

In about 3-5 days an increasing reduction of the nitrogen and calcium elimination occurs in 3-5 days.

During the further course of the metabolism determination it becomes apparent that the enanthate has a strong residual action. Only after about 14 days from the last injection dose the nitrogen and calcium in the urine again start to increase to the value thereof before the start of the medication. No undesirable side effects whatsoever were noticed.

The 16-methyl-$\Delta^{16}$-pregnene of the present invention is a valuable intermediate for the production of known physiologically active 16-methyl steroids, such as dexamethasone.

The following examples are given to more fully illustrate the present invention. The scope of the invention is not, however, meant to be limited to the specific details of the examples.

Example I 5 g. of ($\Delta^{2'}$-pyrazolino)-4',3':1,2$\alpha$-androstane-17$\beta$-ol-3-one are cooked under stirring and under reflux for 15 hours (overnight) in 750 cc. of carbon tetrachloride with 235 g. of acid silica gel. (The acid silica gel is produced from neutral, dried silica gel by suspending in one normal hydrochloric acid, filtering off under suction after 12 hours and drying [20 hours at 120° C.].)

The reaction liquid is filtered from the silica gel and washed with about 2 liters of ethyl acetate. The purified filtrate is concentrated to dryness. The thus obtained crude product amounts to 4.5 g. (U.V.: $\epsilon_{242}$=8100, $\epsilon_{207}$=2700, N=1%).

The crude product is heated on a water bath with 15 cc. of pyridine and 9 cc. of acetanhydride for 1½ hours. The solution is then stirred into ice water. It is extracted with ether and the ether is washed one after the other with 1 normal hydrochloric acid, sodium bicarbonate solution and water. The solution is dried over sodium sulfate and evaporated under vacuum to dryness. The residue is subjected to chromatography over neutral silica gel (10% water). By means of methylene chloride there is isolated in a first fraction 1 g. of a mixed product and then 3.1 g. of crude 1-methyl-$\Delta^1$-androstene-17$\beta$-ol-3-one-17-acetate.

By recrystallization from isopropyl ether there is obtained 2.2 g. of a pure product having a melting point F.=140-141° C.

Example II 4.0 g. ($\Delta^{2'}$-pyrazolino)4',3':1,2$\alpha$-androstane-17$\beta$-ol-3-one are refluxed under stirring for 3 days with 200 g. of acid aluminum oxide (produced as described below) and 400 cc. of carbon tetrachloride. The reaction mixture is then cooled, the aluminum oxide is filtered off under suction and the filtrate is washed with about 2 liters of ethyl acetate. After concentration of the solution the reaction product is recrystallized from isopropyl ether. The thus obtained 1-methyl-$\Delta^1$-androstene-17$\beta$-ol-3-one melts at 150-152° C. U.V.: $\epsilon_{240}$=13,300.

To obtain additional yield the remaining aluminum oxide is extracted hot with ethyl acetate, the obtained residue is purified with the evaporated liquor of the above described pure compound, esterified and subjected to chromatography according to Example I. In this manner there is obtained an additional symbol of 1-methyl-$\Delta^1$-androstene-17$\beta$-ol-3-one in the form of the 17-acetate having a melting point of 137-138° C.

The acid aluminum oxide is produced as follows:

250 g. of aluminum oxide (Woelm acid) is stirred for 5 hours at room temperature in 500 cc. of carbon tetrachloride which have first been saturated with dry hydrogen chloride. It is then filtered off under suction, washed with pure carbon tetrachloride and dried at 50° C. for 1 hour under hydrogen stream vacuum.

Example III 1 g. of ($\Delta^{1'}$-pyrazolino)4',3':1,2$\alpha$-$\Delta^{4,6}$-androstadiene-17$\beta$-ol-3-one-17-acetate and 50 g. of acid silica gel (prepared as described in Example I) are stirred in 150 cc. of carbon tetrachloride for 16 hours at room temperature. It is then filtered off under suction from the silica gel and washed with ethyl acetate. The solvent is evaporated off under vacuum to dryness and the remaining residue is recrystallized from isopropyl ether.

There is thus obtained 1-methyl-$\Delta^{1,4,6}$-androstatriene-17$\beta$-ol-3-one-17-acetate having a melting point F.=219.5-221° C. $[\alpha]_D^{20}$=—95° (c.=1.015 in chloroform). U.V.: $\epsilon_{209}$=16,050; $\epsilon_{262}$=13,660; $\epsilon_{299}$=9,240.

Example IV 1.0 g. of [$\Delta^{1'}$-pyrazolino]-4',3':1.2$\alpha$-$\Delta^{4,6}$-pregnadiene-17$\alpha$-ol-3,20-dione-17-acetate are stirred with 50 g. of acid aluminum oxide (produced as described in Example II) and 50 cc. of carbon tetrachloride for 48 hours at room temperature. The working up then proceeds as described in Example II. The substance which is obtained by shaking with ethyl acetate is subjected to chromatography over silica gel containing 10% of water whereby there is obtained with methylene chloride 1-methyl-$\Delta^{1,4,6}$-pregnatriene-17$\alpha$-ol-3,20-dione-17-acetate which is recrystallized from isopropyl ether and has a melting point of 195.5-196° C. U.V.: $\epsilon_{209}$=14,890; $\epsilon_{264}$=12,660; $\epsilon_{301}$=8,800.

Example V 500 mg. of ($\Delta^{1'}$-pyrazolino)-4',3':16,17-[$\Delta^5$-pregnene-3$\beta$-ol-20-one-acetate] are stirred and heated under refluxing with 25 g. of acid aluminum oxide (produced as described in Example II) and 50 cc. of carbon tetrachloride for 48 hours and then further worked up as described in Example II. The substance which is obtained by shaking with ethyl acetate is rubbed with pentane and the crude 16-methyl-$\Delta^{5,16}$-pregnadiene-3$\beta$-ol-20-one-3-acetate is recrystallized from acetone. The melting point is 166-169° C. Further recrystallization gives a melting point of 173-175° C. U.V.: $\epsilon_{251}$=8,900.

Example VI 2.0 g. of (Δ²'-pyrazolino-4',3':1,2α-androstane-17β-ol-3-one-17-propionate are treated with acid aluminum oxide and 200 cc. of ethyl acetate as described in Example II and then worked up. The obtained crude product is subjected to chromatography over neutral silica gel (10% water). It is recrystallized from methyl alcohol and the resulting 1-methyl-Δ¹-androstene-17β-ol-3-one-17-propionate melts at 120.5–121° C.

Example VII 2.0 g. of (Δ²'-pyrazolino)-4',3':1,2α-androstane-17β-ol-3-one-17-capronate are treated as described in Example VI with acid aluminum oxide and 200 cc. of carbon tetrachloride. It is then worked up and subjected to chromatography as described in Example VI. The thus obtained 1-methyl-Δ¹-androstene-17β-ol-3-one-17-capronate has a melting point of 60–71° C. U.V.: $\epsilon_{239}=13,000$; F., 69–71°.

Example VIII 2.0 g. of (Δ²'-pyrazolino)-4',3':1,2α-androstane-17β-ol-3-one-17-β-cyclopentylpropionate is treated as described in Example VII, further worked up and subjected to chromatography. The thus obtained 1-methyl-Δ¹-androstene-17β-ol-3-one-17-cyclopentylpropionate melts at approximately −8° C. U.V.: $\epsilon_{239}=12,700$.

Example IX 1 g. of (Δ²'-pyrazolino)-4',3':1,2α-androstane-17β-ol-3-one-17-acetate are heated under refluxing with 50 g. of acid silica gel (pretreated as described in Example I) in 150 cc. of ethyl acetate for 15 hours. The silica gel is then filtered off, the filirate is washed with ethyl acetate and the solvent is distilled off under vacuum. The remaining residue is recrystallized with isopropyl ether.

The obtained 1-methyl-Δ¹-androstene-17β-ol-3-one-17-acetate melts at 140–141° C. $[\alpha]_D=+39$(CHCl₃: c.=1); U.V.: $\epsilon_{240}=13,300$.

Example X 1 g. of (Δ²'-pyrazolino)-4',3':1,2α-androstane-17β-ol-3-one-17-enanthate are treated with 150 cc. of carbon tetrachloride and 50 g. of acid silica gel as described in Example VIII and then further worked up. The obtained residue is recrystallized from methanol. The resulting 1-methyl-Δ¹-androstene-17β-ol-3-one-17-enanthate melts at 70–70.5° C. $[\alpha]_D=+32$(CHCl₃: c.=1); U.V.:

$$\epsilon_{240}=13,000$$

Example XI 1 g. of (Δ²'-pyrazolino)-4',3':1,2α-androstane-17β-ol-3-one-17-caprylate are treated as described in Example VIII with 150 cc. of carbon tetrachloride and 50 g. of acid silica gel and then further worked up as described. The obtained 1-methyl-Δ¹-androstene-17β-ol-3-one-17-caprylate has a melting point of 72–73.5° C. U.V.:

$$\epsilon_{240}=13,100.$$

Example XII 5.47 g. of 1-methyl-Δ¹-androstene-17β-ol-3-one in 270 cc. of absolute benzene with 13.7 cc. of ethylene-glycol and 137 mg. of p-toluene sulfonic acid are heated for 5 hours under refluxing under nitrogen. The formed water is continuously taken off. The solution is then diluted with benzene, washed with water until neutral, dried over sodium sulfate and concentrated under vacuum to dryness.

The obtained 1-methyl-Δ¹-androstene-17β-ol-3-one-3-ethylene ketal recrystallized from ethyl acetate melts at 178–179° C.

4.44 g. of the 1-methyl-Δ¹-androstene-17β-ol-3-one-3-ethylene ketal is dissolved in 217 cc. of absolute toluene and 47 cc. of cyclohexanone. Then several cc. are distilled off to remove any present moisture. 2.36 g. of aluminum isopropylate dissolved in 24 cc. of absolute toluene are added during 5 minutes and then the whole is heated to boiling for 45 minutes under slight distillation. It is then steam distilled and the precipitated product after suction filtration and drying is extracted with methylene chloride. This solution is concentrated to dryness under vacuum and the residue recrystallized from isopropyl ether. The resulting 1-methyl-Δ¹-androstene-3,17-dione-3-ethylene ketal melts at 185.5–187.5° C.

2.34 g. of 1-methyl-Δ¹-androstene-3,17-dione-3-ethylene ketal in 168 cc. of absolute benzene is added dropwise under ice cooling during a time period of 25 minutes to an ethereal methyl-magnesium-iodide solution produced from 3.58 g. of magnesium chips, 10.6 cc. of methyl iodide and 60 cc. of absolute ether.

This solution is stored for 4 hours at room temperature under stirring. 700 cc. of a 10% aqueous ammonium chloride solution are then added thereto under ice cooling.

The aqueous phase is separated and extracted with ether. The ether phase and benzene phase are, together, washed with water until neutral, dried over sodium sulfate and concentrated under vacuum to dryness.

2.67 g. of the thus obtained 1,17α-dimethyl-Δ¹-androstene-17β-ol-3-one-3-ethylene ketal are heated under refluxing in 107 cc. of methanol with 30.2 cc. of 8 volume percent of sulfuric acid for 35 minutes and after cooling is stirred into 320 cc. of water containing 10.6 g. of sodium carbonate. It is extracted with methylene chloride, washed with water until neutral, dried over sodium sulfate and after concentration under vacuum the remaining residue is recrystallized from isopropyl ether. There is obtained 1,17α-dimethyl-Δ¹-androstene-17β-ol-3-one having a melting point of 148–149° C.

Example XIII 6.5 cc. of ethyl bromide in 30 cc. of absolute tetrahydrofurane are added dropwise under stirring to 2.09 g. of magnesium chip in 30 cc. of absolute tetrahydrofurane. It is then heated under refluxing for 45 minutes, the solution is decanted from the residue and slowly added to 35 cc. of tetrahydrofurane under stirring and passage through of acetylene (the acetylene has been then passed through the tetrahydrofurane for 15 minutes earlier). After 30 minutes, during which time additional acetylene is passed into the solution, 1 g. of 1-methyl-Δ¹-androstene-3,17-dione-3-ethylene ketal (produced as described in Example XII) dissolved in 30 cc. of absolute tetrahydrofurane are added thereto dropwise. After 21 hours of reaction time at 70° C. the reaction mixture is cooled to 0° C. and 400 cc. of 10% aqueous ammonium chloride solution are added thereto. It is then extracted with ether, the organic phase is washed with water until neutral, dried over sodium sulfate, concentrated under vacuum to dryness and the residue after being rubbed with isopropyl ether is filtered off under suction. There is obtained 850 mg. of crude 1-methyl-17α-ethinyl-Δ¹-androstene-17β-ol-3-ethylene ketal having a melting point of 230° C. The pure compound melts after filtration over silica gel at 241.5–243° C. U.V.: $\epsilon_{240}=3,530$.

400 mg. of 1-methyl-17α-ethinyl-Δ¹-androstene-17β-ol-3-ethylene ketal are heated under refluxing for 35 minutes in 30 cc. of methanol with 4 cc. of 8-volume percent sulfuric acid. The solution is then stirred into ice water. It is extracted with methylene chloride, the methylene chloride phase washed with water until neutral, dried over sodium sulfate and after concentration under vacuum the remaining residue is recrystallized from ethyl acetate. There is obtained 235 mg. of 1-methyl-17α-ethinyl-Δ¹-androstene-17β-ol-3-one having a melting point of 198.5–199.5° C. U.V.: $\epsilon_{240}=13,160$.

Example XIV 370 mg. of 1-methyl-17α-ethinyl-Δ¹-androstene-17β-ol-3-ethylene ketal produced according to Example XIII are dissolved in 40 cc. of pyridine and hydrogenated with the addition of 60 mg. of 5% palladium/carbon catalyst until 1 mol of hydrogen is taken up. The catalyst is then filtered off and the solution is operated under vacuum to dryness. The residue which consists of crude 1-methyl-17α-vinyl-Δ¹-androstene-17β-ol-3-ethylene ketal is heated under refluxing for 35 minutes in 14 cc. of methanol with 3.7 cc. of 8-volume percent sulfuric acid and then stirred into an aqueous solution of 1.46 g. of sodium carbonate. It is extracted with methylene chloride, the organic phase is washed with water until neutral, dried over sodium sulfate and concentrated under vacuum to dryness. After recrystallization from isopropyl ether there is obtained 133 mg. of 1-methyl-17α-vinyl-Δ¹-androstene-17β-ol-3-one having a melting point of 172–174° C. U.V.: $\epsilon_{241}$=13,230.

*Example XV*

370 mg. of 1-methyl-17α-ethinyl-Δ¹-androstene-17β-ol-3-ethylene ketal produced as described in Example XIII in 80 cc. of thiophene-free benzene with 370 mg. of a catalyst according to Lindlar (Helv. 35, 446 (1952)), are hydrogenated until 2 mols of hydrogen are taken up. The catalyst is then filtered off and the solution is concentrated under vacuum until dry. The residue, consisting of 1-methyl-17α-ethyl-Δ¹-androstene-17β-ol-3-ethylene ketal is split to 1-methyl-17α-vinyl-Δ¹-androstene-17β-ol-3-ethylene ketal as described in Example XIV, further worked up and recrystallized. There is obtained 110 mg. of 1-methyl - 17α - ethyl-Δ¹-androstene-17β-ol-3-one having a melting point of 163–164° C. U.V.: $\epsilon_{241}$=13,200.

*Example XVI*

20 g. of 1-methyl-Δ¹-androstene-17β-ol-3-one are heated on a steam bath with 80 cc. of pyridine and 40 cc. of acetic acid anhydride for 2 hours. The solution is stirred into ice water. The resulting precipitate is filtered off under suction, washed with water until neutral, dried under vacuum at 70° C. and recrystallized from isopropyl ether. There is obtained 19.5 g. of 1-methyl-Δ¹-androstene-17β-ol-3-one-17-acetate having a melting point of 138–140° C. A repeated recrystallization brings the melting point to 140–141° C. $[\alpha]_D^{20}$=+46.8° (CHCl)₃: c.=1); U.V.: $\epsilon_{240}$=13,300.

In analogous manner there in obtained by reaction with propionic acid anhydride the 1-methyl-Δ¹-androstene-17β-ol-3-one-17-propionate having a melting point of 120.5–121° C. (from methanol).

*Example XVII*

2 g. of 1-methyl-Δ¹-androstene-17β-ol-3-one are heated for 4 hours in a reflux condenser at 125° C. with 8 cc. of pyridine and 4 cc. of valeric acid anhydride. The excess valeric acid anhydride is removed by steam distillation. The residue is taken up in ether, washed with saturated sodium carbonate solution and water until neutral, dried over sodium sulfate, freed from ether by distillation and subsequently recrystallized from isopropyl ether. There is obtained in a yield of approximately 93% of the theorethical pure 1-methyl-Δ¹-androstene-17β-ol-3-one-17-valerianate having a melting point of 83–84.5° C. U.V.: $\epsilon_{241}$=13,300.

In analogous manner there is obtained by reaction with the anhydride of capronic acid, enanthic acid, caprylic acid, caprinic acid, and cyclopentylpropionic acid the corresponding 17-esters of 1-methyl-Δ¹-androstene-17β-ol-3-one.

Capronate, M.P. 69–71° C.; U.V.: $\epsilon_{239}$=13,000
Enanthate, M.P. 70–70.5° C.; $[\alpha]_D^{20}$=+32°; CHCl₃: c.=1); U.V.: $\epsilon_{240}$=13,000
Caprylate, M.P. 72–73.5° C.; U.V.: $\epsilon_{240}$=13,100
Caprinate, M.P. 62.5–63° C.; U.V.: $\epsilon_{241}$=13,400
Cyclopentyl-propionate oil, M.P. about −8° C.; U.V.: $\epsilon_{239}$=12,700

*Example XVIII*

900 mg. of 1-methyl-Δ¹-androstene-17β-ol-3-one are dissolved in 2.5 cc. of pyridine and 1.5 cc. of dioxane. 0.55 cc. of hexahydrobenzoylchloride are added dropwise under cooling and stirring to the solution. After 48 hours of shaking it is stirred into ice water and extracted with ether. The ether extract is one after the other washed with dilute hydrochloric acid, 0.4% sodium hydroxide and water, dried and evaporated to dryness. The oily residue is subjected to chromatography over 50 times the amount of aluminum oxide (quality according to Woelm: acid+1% water). The crystalline fraction which is eluated with a mixture of carbon tetrachloride and methylene chloride (1:1) is purified and recrystallized from hexane. There is obtained in a yield of approximately 88% of the theoretical pure 1-methyl-Δ¹-androstene - 17β - ol-3-one-17-hexahydrobenzoate having a melting point of 90–91° C. U.V.: $\epsilon_{240}$=13,200.

In analogous manner there is produced by means of phenyl propionic acid chloride the corresponding 17-phenyl propionate.

EXAMPLES FOR THE PRODUCTION OF INJECTABLE PREPARATIONS

*Example A*

50 g. of 1-methyl-Δ¹-androstene-17β-ol-3-one-17-acetate are dissolved in a mixture of 6 parts by volume of sesame oil and 4 parts by volume of benzylbenzoate to a total volume of 1000 liters. The solution is sterile filtered through a degerminating filter (Seitz, EKS II) and under antiseptic conditions introduced into ampoules so that each ampoule contains 50 mg. of the acetate.

*Example B*

100 g. of 1-methyl-Δ¹-androstene-17β-ol-3-one-enanthate are dissolved in sesame oil to a total volume of 1000 liters, sterile filtered and under aseptic conditions filled into ampoules so that each ampoule contains 100 mg. of the enanthate.

Instead of sesame oil it is possible to use as solvent for injection purposes other oils in which the steroids are soluble, such as peanut oil, arachis oil, cottonseed oil, castor oil and the like.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

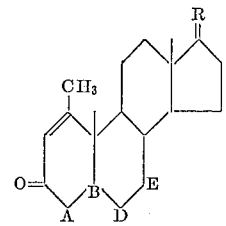

wherein R is selected from the group consisting of:

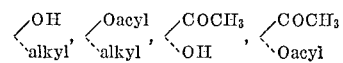

wherein

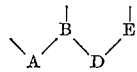

is selected from the group consisting of

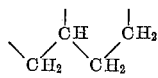

and

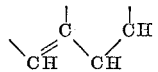

2. A compound of the formula:

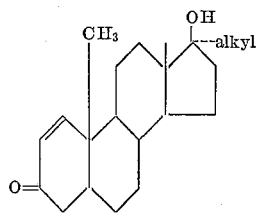

wherein alkyl is a lower alkyl.

3. A compound of the formula:

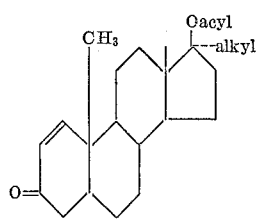

wherein acyl is derived from a carboxylic acid of up to 11 carbon atoms and wherein alkyl is a lower alkyl.

4. A 17-carboxylic acid ester of 3 to 11 carbon atoms of 1-methyl-Δ¹-androstene-17β-ol-3-one.

5. 1,17α-dimethyl-Δ¹-androstene-17β-ol-3-one.

6. 1-methyl-Δ¹-androstene-17β-ol-3-one-17-capronate.

7. 1-methyl-Δ¹-androstene-17β-ol-3-one-17-cyclopentylpropionate.

8. 1-methyl-Δ¹-androstene-17β-ol-3-one-17-caprylate.

9. 1-methyl-17α-ethinyl-Δ¹-androstene-17β-ol-3-one.

10. 1-methyl-17α-vinyl-Δ¹-androstene-17β-ol-3-one.

11. 1-methyl-17α-ethyl-Δ¹-androstene-17β-ol-3-one.

12. 1-methyl-Δ¹-androstene-17β-ol-3-one - 17 - hexahydrobenzoate.

13. 1-methyl-Δ¹-androstene-17β-ol-3-one-17-acetate.

14. 1-methyl-Δ¹-androstene-17β-ol-3-one-17-enanthate.

15. A method of producing α,β-unsaturated ketosteroids having a methyl group on the β-positioned carbon atom, which comprises treating a pyrazoline obtained by adding diazomethane to an α,β-unsaturated ketosteroid distributed in an organic liquid which is non-reactive therewith with an acid adsorption agent selected from the group consisting of aluminum oxide, silica gel, fuller's earth and ion exchange resins, thereby splitting off nitrogen and forming the corresponding methyl derivative; and recovering said methyl derivative.

16. The method which comprises treating a pyrazoline of the formula:

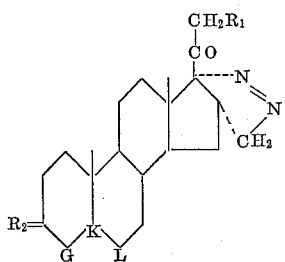

wherein $R_1$ is selected from the group consisting of hydrogen, OH and Oacyl, wherein $R_2$ is selected from the group consisting of

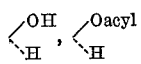

wherein acyl is derived from a carboxylic acid of up to 11 carbon atoms, and wherein

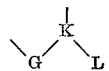

is selected from the group consisting of

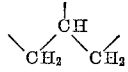

and

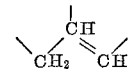

distributed in an organic liquid which is non-reactive therewith with an acid adsorption agent selected from the group consisting of aluminum oxide, silica gel, fuller's earth and ion exchange resins, thereby splitting off nitrogen and forming the corresponding 16-methyl derivative; and recovering said 16-methyl derivative.

17. The method which comprises treating a pyrazoline of the formula:

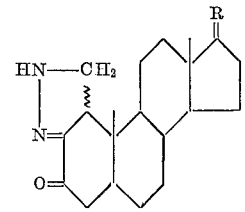

wherein R is selected from the group consisting of:

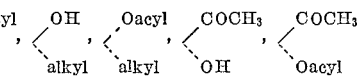

wherein alkyl is a lower alkyl and wherein acyl is derived from a carboxylic acid of 1–11 carbon atoms distributed in an organic liquid which is non-reactive therewith with an acid adsorption agent selected from the group consisting of aluminum oxide, silica gel, fuller's earth and ion exchange resins, thereby splitting off nitrogen and forming the corresponding 1-methyl derivative; and recovering said 1-methyl derivative.

18. The method which comprises treating a pyrazoline of the formula:

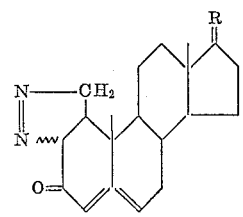

wherein R is selected from the group consisting of:

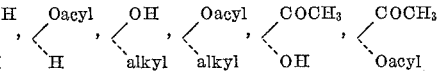

wherein alkyl is a lower alkyl and wherein acyl is derived from a carboxylic acid of 1–11 carbon atoms distributed in an organic liquid which is non-reactive therewith with an acid adsorption agent selected from the group consisting of aluminum oxide, silica gel, fuller's earth and ion exchange resins, thereby splitting off nitrogen and forming the corresponding 1-methyl derivative; and recovering said 1-methyl derivative.

References Cited in the file of this patent

UNITED STATES PATENTS

| | | |
|---|---|---|
| 2,697,109 | Dodson | Dec. 14, 1954 |
| 2,962,510 | Hiersemann et al. | Nov. 29, 1960 |
| 3,006,929 | Colton et al. | Oct. 31, 1961 |

OTHER REFERENCES

Djerassi et al.: J.A.C.S. 72, pages 4534–40.